United States Patent
Krämer et al.

[11] Patent Number: 5,277,435
[45] Date of Patent: Jan. 11, 1994

[54] STANDARD SHANK AND METHOD FOR DIRECTLY LOCATING ROTATING CUTTING TOOLS IN A MACHINE TOOL WORK SPINDLE

[75] Inventors: Johann Krämer, Leonberg; Bruno Teusch, Esslingen; Rainer Renz; Dieter Jenuwein, both of Stuttgart, all of Fed. Rep. of Germany

[73] Assignee: Mercedes-Benz AG, Fed. Rep. of Germany

[21] Appl. No.: 933,690

[22] Filed: Aug. 24, 1992

[30] Foreign Application Priority Data

Aug. 28, 1991 [DE] Fed. Rep. of Germany ....... 4128463

[51] Int. Cl.⁵ ............... B23B 31/117; B23B 31/20
[52] U.S. Cl. .......................... 279/9.1; 29/447; 403/28; 403/273; 403/404; 279/43.1; 279/156; 279/158; 279/2.01; 408/239 R; 409/234
[58] Field of Search ............ 279/9.1, 43.1, 43.2, 279/43.5, 102, 103, 158, 2.01, 156; 408/239; 409/232, 234; 403/404, 28, 273; 285/187, 381; 29/447

[56] References Cited

U.S. PATENT DOCUMENTS 5,140,739 8/1992 Yamaguchi et al. .......... 409/233 X

FOREIGN PATENT DOCUMENTS

| | | |
|---|---|---|
| 0004696 | 10/1979 | European Pat. Off. . |
| 0437322 | 7/1991 | European Pat. Off. . |
| 2639320 | 8/1979 | Fed. Rep. of Germany . |
| 3007307 | 7/1981 | Fed. Rep. of Germany . |
| 3909630 | 9/1990 | Fed. Rep. of Germany . |
| 2227077 | 11/1974 | France . |
| 199306 | 9/1987 | Japan ................... 279/158 |
| 645773 | 2/1979 | U.S.S.R. ................. 279/102 |

*Primary Examiner*—Steven C. Bishop
*Attorney, Agent, or Firm*—Evenson, McKeown, Edwards & Lenahan

[57] ABSTRACT

A cylindrical standard shank is provided for rotating cutting tools for locating a standard shank in a cylindrical location opening, precisely produced with regard to shape and true-running accuracy, in the work spindles of so-called transfer lines or of, for example, steep-taper adaptors. The cutting tool is, in turn, fixed by a cylindrical press connection in the standard shank serving as an adaptor between the tool shank and standardized location opening. The standard shank has, at the front, a longitudinally slotted clamping sleeve accurately machined on the inside and outside. The clamping sleeve is clamped by an accurately machined shrink collar of shape-memory alloy which is approximately the same length and has at least the same wall thickness, is present in the austenitic structural state at room temperature and in the process is reduced in diameter on account of suitable pretreatment, and bears tightly against the periphery of the clamping sleeve. The shrink collar can be transformed into the martensitic structural state by undercooling and can thereby be widened in diameter, as a result of which the clamping sleeve is relieved and the cutting tool located in the standard shank can be exchanged.

10 Claims, 2 Drawing Sheets

STANDARD SHANK AND METHOD FOR DIRECTLY LOCATING ROTATING CUTTING TOOLS IN A MACHINE TOOL WORK SPINDLE

BACKGROUND AND SUMMARY OF THE INVENTION

The present invention relates to a cylindrical standard shank and method for rotating cutting tools and, more particularly, to a cylindrical standard shank used in industrial large-scale machining production with transfer lines.

In industrial large-scale machines applications of this type, the many work spindles to be tooled are preferably provided with standardized location openings for direct location of the cutting tools in order to avoid expensive chucks, a loss of clamping accuracy and avoid true-running errors. A high true-running accuracy is important in order to be able to achieve long tool life of the cutting tools. However, so that the cutting tools, which vary quite a lot in size, can be inserted into the standardized location openings, a standard shank serving as an adaptor must in each case be attached to the tool shank of each cutting tool. In such arrangement, the mutual connection must, of course, be realized with the greatest possible true-running accuracy and high clamping force and in a low overall volume.

In the case of conventional standard shanks, the cutting tool must be brazed or adhesively bonded into place in the location bore of the standard shank. Neither the brazed nor the adhesively bonded connection can be released again in such a way that the standard shank could be reused. Alternatively, the cutting tool must be pressed by a very tight press fit into the standard shank location bore, which is produced undersize, or the location bore of the standard shank must be shrunk onto the shank of the cutting tool by heating and subsequent cooling, so that the cutting tool can no longer be nondestructively removed therefrom.

The abovementioned locating techniques for a cutting tool are certainly very space-saving and have sufficient true running accuracy if the working surfaces of the cutting tool are ground in the tool grinding machine only after the cutting tool is inserted and fixed in the standard shank and upon location of the entire tool on the joining cylinder of the standard shank. In all these cases, however, the standard shank must also be scrapped after complete wear or fracture of the cutting tool. In addition, brazing the cutting tool in place can only be realized in the case of certain tool materials, namely carbides, and even in the case of these materials only by tolerating certain structural impairments.

Clamping the cutting tools in the standard shank with a collet, although conceivable, would not be suitable in practice, since such clamping can reproduce only too low a true-running accuracy, produces inadequate fixing of the cutting tool in the standard shank, and could be realized at adequate stability only with a large overall volume, especially radially.

The same reasons also apply in principle to the clamping of the cutting tools in a standard shank with a metal collar which can be acted upon hydraulically (cf., e.g., German Offenlegungsschrift 3,909,630 or German Patent No. 2,639,320), where the disadvantages of a large overall volume and a cutting tool mounting arrangement, floating within limits, especially becoming apparent. Furthermore, uniformly maintaining the hydraulic clamping pressure at a high level over the entire life of the cutting tool is here very problematic and is not truly achieved in practice.

It would also be conceivable to effect the clamping of the cutting tool in place in the standard shank with a so-called whistle-notch connection, as is also provided for clamping the standard shank in place in the work spindle of the machine tool. Such a whistle notch is formed by a sloping face on the shank periphery, which sloping face is slanted by about 2° to the inside and on which a grub screw acts which is arranged orthogonally thereto in the wall of the work spindle. This joining technique is, however, only suitable for larger shank diameters. Besides, for spindle-side clamping, it represents, on one hand, an unavoidable compromise between the demands for high true-running accuracy, here only just justifiable, and quicker as well as simpler releasability of the clamping using, on the other hand, available conventional workshop techniques.

Using a whistle-notch connection once again in the same tool-clamping arrangement would allow the unavoidable true-running errors to accumulate to an inadmissibly large degree. In addition, the connection between cutting tool and standard shank is not to be releasable with simple workshop techniques. For these reasons, the use of so-called whistle-notch connections between the cutting tool and standard shank is not suitable.

An object of the present invention is to improve the standard shank and to provide a method to the effect that the cutting tool can certainly be easily located, in a releasable manner, to be clamped, and consequently the standard shank can easily be used again repeatedly. Nonetheless, with a small overall volume of the clamping device, the cutting tool can be held in position with high retaining force and at a high, reproducible true-running accuracy in accordance with the present invention. In addition, the tool life is on no account to be impaired by the nature of the novel tool clamping but is to be advantageously influenced if at all possible.

This object has been achieved according to the invention by providing that unitarily connecting the standard shank having a thin-walled clamping sleeve in the front axial area of the location bore to a remaining portion of the standard shank and provided at a periphery thereof with a cylindrical outer surface of defined outside diameter, pushing a shrink collar of a shape-memory alloy configured to be onto the clamping sleeve, an axial length of said shrink collar approximately corresponding to, at most, an axial length of the clamping sleeve wherein the shape-memory alloy is selected with regard to its composition (alloy type) such that an its austenite finishing temperature thereof is below a working temperature, and passing the shrink collar through manufacture-induced states to achieve an intended function thereof. These states include working an inner surface of the shrink collar facing the clamping sleeve starting from an austenitic structural state to a clear undersize relative to an outside diameter of the clamping sleeve so that high pre-tension theoretically results when the shrink collar is paired with the outer surface of the clamping sleeve, expanding the shrink collar, subsequently transformed by undercooling into a martensitic structural state, in the peripheral direction such that the diameter of the inner surface of the shrink collar in the martensitic structural state has a slight oversize relative to the clamping sleeve, and selectively displacing the shrink collar on the clamping sleeve.

Accordingly, the releasability of the cutting tool from the standard shank is provided through the use of the collet principle, which is known per se but for several reasons is inadequate in conventional design, for the present tool clamping. Nonetheless, the high clamping force which can thereby be achieved and the reproducibly high clamping accuracy at a small radial overall volume surprisingly result from the use of a shrink collar of known shape-memory alloy. On account of the high clamping pressure uniformly effective over the entire intrados (inner arch) surface of the clamping sleeve, the accuracy of the intrados surface can become fully effective during the tool clamping.

During transformation, produced by heating, of the material structure of the shrink collar from martensitic (undercooled) into austenitic (room temperature), the shrink collar shrinks in diameter on account of the shape memory of the alloy. In the course of this shrinkage, the collar bears on the outside of the clamping sleeve with high force. Due to the high true-running accuracy, residual out-of-balance effects and thus the excitation of out-of-balance vibrations of the tool are very slight, which has an advantageous effect on the machining accuracy and the tool life.

In addition, the tool clamping arrangement according to the present invention has proved to have an astonishingly good vibration-damping characteristic, which likewise improves the machining accuracy and the tool life. The vibration-damping effect comes about, on one hand, through the two concentric, cylindrical fitting-surface pairs on account of a clamping hysteresis and, on the other hand, on account of the good damping property of the shrunk collar shape-memory material itself.

When the invention is widely used in large-scale machining production of a large company, a great number of advantages are obtained. For instance the standard shank can easily be used again upon fracture or after complete utilization of the regrinding reserve of the cutting tool located therein. On account of the standard shank roughly twice as expensive by itself compared with the unit price of the cutting tool and on account of the reusability of the standard shank, there is a great savings potential when there are a large number of standard shanks in a large-scale production. Despite the releasability of the cutting tool, it can be clamped in place in the standard shank or held in position therein at a reproducibly high true-running accuracy and high retaining force. Since the tool clamping takes place at temperatures at which the material structure of all conventional cutting-tool materials remains completely unchanged (i.e. low temperatures) and also no phases of high thermal expansion are passed through, tools made of all conceivable materials, in particular the relatively inexpensive high-speed cutting steel or the especially wear-resistant cutting ceramics, can be clamped with the standard shank according to the present invention.

Compared with conventional change clamping tools, the standard shank of the present invention provides (1) an unequalled high retaining force; (2) an unequalled high true-running accuracy ($<15\mu m$) which can be reproduced even after repeated clamping; (3) an unequalled low overall volume, particularly in a radial respect, which is especially important for machining in restricted surroundings of a workpiece; (4) high damping action of the shrink collar, made of shape-memory alloy, against radial vibrations; (5) independently thereof, a damping effect through two joining surface pairs, lying concentrically one inside the other, on account of a clamping hysteresis; (6) on account of the high damping effect of the tool-clamping arrangement against radial vibrations of the tool, longer tool life can be achieved with this tool-clamping arrangement than with known tool-clamping arrangements having less effective damping; (7) the clamping connection between cutting tool and standard shank can be released relatively simply undercooling by placing in dry ice ($CO_2$) or immersing in liquid nitrogen, but it cannot be released, not even inadvertently, by the machine operator of a transfer line using the conventional workshop techniques in-situ there, so that there is a tool-clamping arrangement which is reliable for a long period; (8) standardized cutting tools, which are thus less expensive and can subsequently be delivered at short notice, can be located and fixed in the already finish-ground state in the standard shank by the customer or user of the tools so that costly stock-keeping, planned for the long term, of expensive special tools at the user's can be dispensed with; and (9) the standard shank, if it is hollow-drilled, permits reliable and loss-free conduction of cooling and lubricating emulsion without a separate seal through the clamping arrangement of the cutting tool.

German Offenlegungsschrift 3,007,307, for example, certainly discloses reversibly releasable shrink connections with the use of shrink collars of shape-memory alloy, but here this concerns the connection of abutting cylindrical parts, in particular tubes, which are connected by a shrink collar resting directly on the two tube ends and bridging the joint. In view of the high accuracy requirements for tool-clamping arrangements, it could not be foreseen by the person skilled in the art and active in this field that the shrink connection known from the field of steel construction, when applied to a collet, which does not produce the necessary clamping accuracy for the present use, is nonetheless completely satisfactory here with regard to all requirements to be met. Therefore, application to a completely different field in a modified use of the shrink collars of shape-memory alloy must be considered to be original, technically unconventional and outstanding.

By the length restriction of the longitudinal slots of the clamping sleeve, the clamping arrangement of the tool shank of the present invention is to be effectively sealed off against loss or premature escape of cooling and lubricating emulsion.

BRIEF DESCRIPTION OF THE DRAWINGS

These and other objects, features advantages of the present invention will become more readily understandable from the detailed description of a currently preferred embodiment when in conjunction with the accompanying drawings where.

DETAILED DESCRIPTION OF THE DRAWINGS

Figure 1:
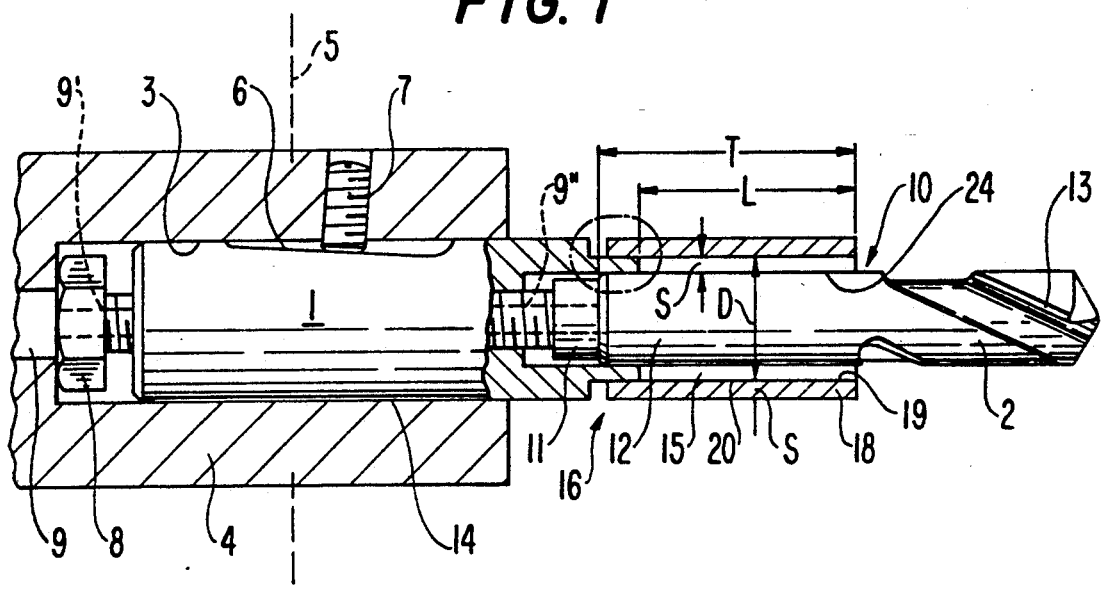
FIG. 1 is a longitudinal sectional view through the front end of the work spindle of a maohine tool having a standard shank including cutting tool located therein.
Figure 2:
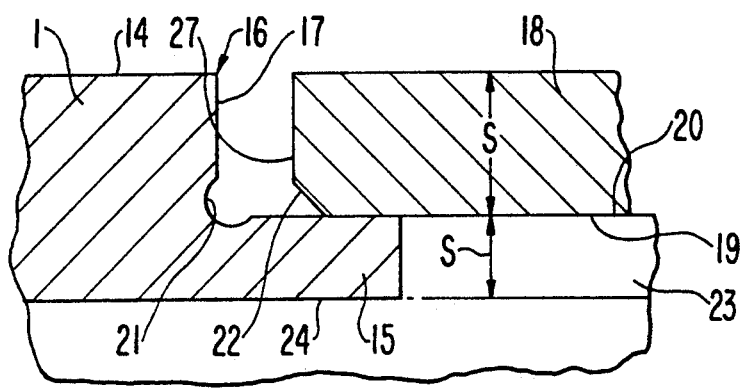
FIG. 2 is a enlarged individual representation of detail II shown by the dot-dash portion in FIG. 1.
Figure 3:
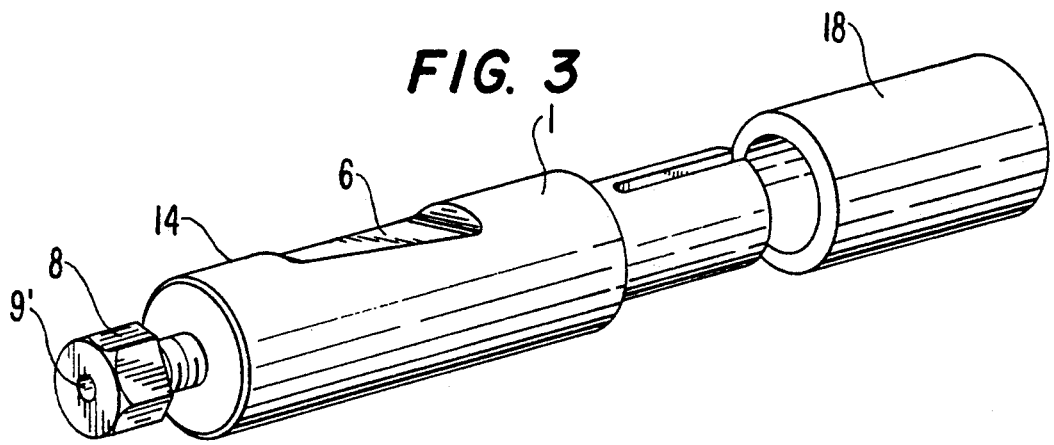
FIG. 3 is a perspective view of the standard shank alone and the shrink collar shown ready for slipping onto the standard shank on the same axis.

FIG. 1 shows the tool-side end of a work spindle 4 of a machine tool 5 (shown only schematically), in particular in large-scale machining production, e.g. of a transfer line. At its front end, the work spindle has a location opening 3 which is precision-finished with regard to form and true-running accuracy and is identical, that is, standardized for all work spindles of the same size of the transfer line. The cutting tools, which vary depending on the intended operation, are to be located directly in the work spindle, i.e. without the interposition of a variable chuck. Therefore, the cutting tools must all have a cylindrical standard shank 1 which is adapted to the standardized location opening 3, serves as an adaptor and is fixed in a durable manner with the respective cutting tool by means of a cylindrical press connection 10. A precise joining cylinder 14 being only a slightly undersize (for example about 1 to 4 μm) relative to the cylindrical location opening 3 in the work spindle 4 is ground onto the outer periphery of the standard shank 1.

For reasons of working accuracy and tool-life, provision must be made for the highest possible true-running accuracy of the working surfaces 13 of the cutting tool 2 relative to the joining cylinder 14 of the standard shank 1. A high true-running accuracy is also important in order to avoid out-of-balance effects. The lack of true-running accuracy leads to a dynamic radial deformation of the tool during the often very high spindle speeds, and this radial deformation, in turn, leads to additional working inaccuracy and loss of tool life.

To form the cylindrical press connection between the standard shank 1 and cutting tool 2, a radially flexible clamping sleeve 15 is provided on the standard-shank side. The clamping sleeve 15 is connected monolithically (unitarily) to the standard shank 1 and is provided on the inside with a location bore 20 of defined diameter. A shrink collar 18 of shape-memory alloy surrounds the clamping sleeve 15 to radially clamp the latter. Through temperature change, the shape-memory alloy can be reversibly changed in material structure and thus also slightly dimensionlly so that high radial forces can accordingly be reversibly exerted. A cylindrical tool shank 12 is provided on the tool side.

In the illustrated embodiment, the standard shank 1 is clamped in place in the location opening 3 of the work spindle 4 by a so-called whistle-notch connection formed by a sloping face 6 on the shank periphery. The sloping face 6 is slanted to the inside by about 2°. A grub screw 7 acts on the sloping face 6 and is arranged orthogonally thereto in the wall of the work spindle 4. This joining technique has proved successful for larger shank diameters, although for the spindle-side clamping of the standard shank 1 it represents an unavoidable compromise between, on one hand, the demands for high true-running accuracy (here only just acceptable) and, on the other hand, quicker as well as simpler releasability of the clamping using conventional workshop techniques (here available).

An adjusting screw 8 is arranged at the front side of the standard shank 1 remote from the cutting tool and pointing into the base of the location opening 3 of the work spindle 4. The adjusting screw 8 can be screwed only with tight action in the standard shank 1 and is intended for adjusting the insertion depth of the standard shank 1 into the location opening 3. In a similar manner, an adjusting screw 11, which can likewise be screwed only with a tight action in the standard shank 1 is provided at the base of the location bore 24, as described in more detail below. The adjusting screw 11 sets the insertion depth T of the cutting tool 2 into the location bore 24 independently of the aforementioned depth-adjusting structure.

The adjusting screws 8, 11 are centrally bored along these axes, i.e. bores 9,9', respectively, over their entire length for the passage of cooling and lubricating emulsion. The work spindle 4, as with the standard shank 1 and the cutting tool 2, is provided with central bores 9 so that the cooling and lubricating emulsion can be directed directly into the area of the machining working surfaces 13 of the cutting tool 2.

The press connection 10 between the standard shank 1 and the cutting tool 2 is easily sufficiently tight in an advantageous manner and special precautions against premature escape or loss of cooling and lubricating emulsion are unnecessary. To this end, the longitudinal slots 23 in the clamping sleeve 15 merely needs to be sized shorter (length L) in the insertion direction of the cutting tool 2 than the smallest insertion depth T of the tool shank 12 into the location bore 24 of the standard shank 1.

The press connection 10 between the standard shank 1 and the cutting tool 2 or the tool shank 12 is also configured to be releasable at high true-running accuracy by virtue of the fact that the standard shank 1, in the front axial area of the location bore 24, has a thin-walled, longitudinally slotted clamping sleeve 15 having the longitudinal slots 23. The clamping sleeve 15 is connected monolithically integrally to the remaining material of the standard shank 1. The inside of the clamping sleeve 15 is formed by the location bore 24, which is dimensionally produced to high accuracy and which, with its dimensional accuracy, essentially determines the true-running accuracy of the press connection 10. The clamping sleeve 15 is, however, also provided with a defined outside diameter D on its external surface 20.

A shrink collar 18 of a shape-memory alloy, e.g. a nickel/titanium alloy, is pushed onto the clamping sleeve 15. The axial length of which shrink collar 18 is slightly less than that of the clamping sleeve 15. Although the clamping sleeve 15 can have a relatively small wall thickness s, for reasons of minimum stability this wall thickness s should not be too small. Furthermore, the clamping sleeve 15 must not be too thick-walled, since it would otherwise become too rigid in the radial direction and could not be pressed with sufficiently high force against the shank of the tool by the shrink collar. In the case of a very thick-walled clamping sleeve, this clamping sleeve could certainly be compressed by a shrink collar of even thicker dimensions, but the entire clamping connection would thereby not only become unnecessarily large in construction in the radial direction, but the shrink collar, on account of the expensive material from which it is made, would also become very expensive.

The wall thickness S of the shrink collar 18 corresponds at least to the wall thickness s of the clamping sleeve 15. The wall thickness S of the shrink collar 18 will preferably be selected to be at least 15% of the diameter of the tool shank 12. For this reason, the clamping sleeve 15 merges on the outside via a shoulder 16 into the other outer periphery of the standard shank 1. The transition from the face 17, which is perpendicular to the standard shank axis, to the clamping sleeve 15 is neatly filleted at corner 21 in order to cushion a notch effect.

Shape-memory alloys are alloy types known per se for which there is also specific literature which is to be referred to here. It may simply be mentioned at this point that the shape-memory alloy for the present invention is selected such that the austenite finishing temperature thereof is below the working temperature, preferably around 10° C. Consequently, the austenitic structural state of the shrink collar is present at room or working temperature, whereas artificial cooling or undercooling must take place to transform the shrink collar into the martensitic structural state.

So that the shrink collar 18 can perform its intended function in the releasable configuration of the press connection 10, the shrink collar must pass through the following working states which the shrink collar can "remember" on account of the shape-memory property of the material. In this case, the shrink collar 18 can be treated as an individual bush or even as a continuous tube in the manner described below. The use of a longer tube to form the collars has the advantage that a plurality of identical shrink collars can be worked simultaneously. From the longer tube pre-treated in such a way, individual shorter shrink collars then merely need to be cut off on the lathe or cut to length in another way.

Starting from an austenitic structural state of the material of the shrink collar 18 or a corresponding longer tube, the inner surface 19 of the shrink collar facing the clamping sleeve 15 must be worked down to a clear undersize relative to the outside diameter D of the clamping sleeve 15 so that a high pre-tension then theoretically results when the shrink collar 18 is paired with the outer surface 20 of the clamping sleeve 15. This working in the austenitic structural state can be done by machining or also by solid forming, for example by drawing through an annular nozzle or by free stretch-forming.

The subsequent working must be carried out in the martensitic structural state, which can be brought about by undercooling and, provided a shape-memory alloy having so-called expanded hysteresis is not used, must be maintained by constantly keeping the material cool. The working in the martensitic structural state may only be done by solid forming. Specifically, the shrink collar is extended in the peripheral direction expediently with unimpeded axial contraction, to such an extent that, in the relieved state, the diameter of the inner surface 19 of the shrink collar 18 or a corresponding tube has a slight oversize relative to the clamping sleeve 15 or its outer surface 20 and the shrink collar 18 can be displaced on the clamping sleeve 15 without great expenditure of force.

Provided that care is taken, the solid forming of the shrink collar to be carried out in the martensitic structural state can also be carried out as follows. First, a tool shank 12 is inserted into the location bore 24 of a clamping sleeve 15 without a shrink collar 18. The shrink collar 18 in the martensitic state is then carefully pushed in a press device axially onto the outer surface 20 of the clamping sleeve 15, in the course of which pushing the shrink collar 18 is plastically expanded in diameter. The shrink collar must then be transformed into the austenitic structural state by suitable common temperature treatment of shrink collar, tool and standard shank. In the case of a shape-memory alloy having expanded hysteresis, the construction unit for this step must therefore be heated once beyond the austenite finishing temperature and can then cool down to the working temperature, usually the room temperature. In the simplified, second working step just briefly described for the shrink collar 18, the shrink collar is finish-worked by solid forming to some extent by being used for the first time in the still virgin state.

So that the longer-lasting working of the martensitic shrink collar does not have to be carried out at low temperatures below the freezing point, it is convenient to use for the shrink collar a shape-memory alloy having a so-called expanded hysteresis in which there is difference of at least 50 to 80 degrees Kelvin between the martensite starting temperature and the austenite starting temperature. In such an alloy, martensitic structure can still be present even at room temperature given a suitable position of the transformation zones within the temperature range and suitable pre-treatment, although during cooling the transformation into the martensitic structural state may only take place at substantially lower temperatures. For this reason, the working required in this structural state can be advantageously carried out at room temperature.

So that a tool shank 12 can be connected at the press connection 10 to the standard shank 1 by the shrink collar 18 prepared in such a way, the tool shank 12 is inserted into the location bore 24 to the desired depth T, and then the shrink collar 18, which is in the martensitic structural state, is pushed onto the clamping sleeve 15. In the course of this pushing, care has to be taken, if need be, to ensure that the martensitic structural state is at first still retained, i.e., that an even only partial structural transformation into the austenitic state does not occur by heating at the ambient air and/or at the standard shank 1. When the shrink collar 18 is pushed onto the clamping sleeve 15, provided the shrink collar in the pushed-on state otherwise provides no attaching surfaces for an extracting device, care should be taken to ensure that a sufficiently large gap in the axial direction for attaching the claws of an extracting device remains between the face 17, perpendicular to the axis, of the shoulder 16 and the opposite front side 27 of the shrink collar 18.

In order to produce the press connection, the shrink collar 18 must be transformed into the austenitic structural state, which takes place by heating to room temperature. Here, the shrink collar can be heated from the free end, that is, from the cutting tool 2, so that the structural transformation from martensitic into austenitic progresses from the free end axially through the shrink collar and the press connection 10 begins to close from the free end of the shrink collar. Peristaltic shrinking-on of the shrink collar thus occurs from the free end in the direction of the shoulder 16. Due to the shrinking of the collar 18 onto the clamping sleeve 15, the tool shank 12 is clamped very tightly in place in the clamping sleeve 15. As a result, a stable, load-bearing bond between the standard shank 1, the clamping sleeve 15 and the shrink collar 18 is achieved. Due to the configuration according to the present invention of the press connection 10, the tool shank 12, despite the small constructional dimensions of the press connection 10 especially in a radial direction, can be held in position at high clamping force and high true-running accuracy.

So that the press connection 10 can be again released, the standard shank 1 with the cutting tool 2 located therein merely needs to be placed in dry ice, i.e. $CO_2$, liquid air or liquid nitrogen. By the undercooling of the tool which can be brought about in such a way, the material of the shrink collar 18 is transformed into the martensitic structural state, as a result of which the shrink collar, at least when it is "trained", which takes place automatically, however, by repeated tool change, restores itself from memory to the dimensional state brought about in this structural state, and the shrank collar 18, having a larger diameter, expands diametrically and releases the press connection 10.

The tool shank 12 can thereby be pulled out of the clamping sleeve 15 or the location bore 24 without a large expenditure of force. As long as the shrink collar 18 is not yet "trained", the clamping is quite clearly relieved of load on account of the lower modulus of elasticity and the lower yield point of the now martensitic collar material as well as on account of the forces of the clamping sleeve 15, which are directed radially outwards and act in a load-relieving manner. Thus, the tool shank 12 can always be removed from the standard shank 1 without damage.

With an increasing number of tool changes, the shrink collar 18 becomes more and more trained and the relieving effect becomes better and better after transformation of the shrink collar into the martensitic state. In this way, a tool change in the standard shank 1 can be carried out easily and quickly, even if only in a special workshop where the appropriate undercooling means are available. Apart from the case of a still untrained shrink collar, a certain axial tightness of action of the radially widened shrink collar on the clamping sleeve 15 can also develop by the shrink collar 18 being stuck fast on the clamping sleeve 15 by dried-on and/or resinified coolant or by the surfaces of both parts adhering to one another locally by molecular adhesion. So that the shrink collar 18 transformed into the widened state can be extracted axially from the clamping sleeve 15 despite such a tightness of action, the shrink collar 18 is extracted by an extracting device attached thereto, for which purpose the abovementioned peripheral gap has been left between the face 17, perpendicular to the shank axis, and the front side 27 of the collar 18. In-situ on the machine tool, an exchange of the cutting tools inside a standard shank using conventional workshop techniques is never possible, not even inadvertently. Despite the possibility of releasing the press connection 10 without force, however, the press connection 10 sits firmly in a durable manner at room temperature.

Figure 4:
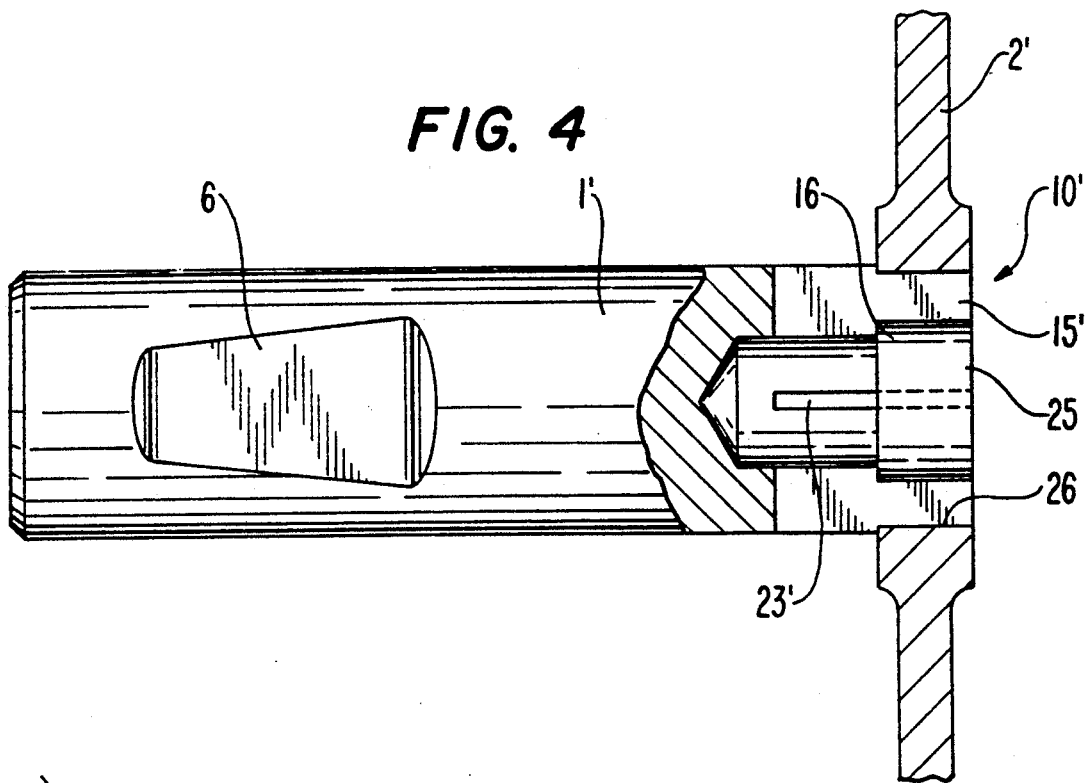
FIG. 4 is a partial cross-sectional view of a modified embodiment of the standard shank for the releasable accommodation of a cutting tool having a center bore on a mounting mandrel having a displacement plug.

The principle of the releasable clamping connection 10 is also, as it were, reversible as indicated in FIG. 4. The standard shank 1' serves to locate a disc-shaped cutting tool 2' having a central bore 26' which is to be connected to the standard shank 1' in a true-running manner and at high retaining force via a press connection 10'. For this purpose, a clamping sleeve 15' is likewise attached to the standard shank 1, the clamping sleeve 15' directly locates the cutting tool 2' on its outside like a mounting mandrel. A displacement plug 25 of shape-memory alloy is inserted into the interior of the mounting mandrel formed in such a way, and bears axially against a shoulder 16'. In the austenitic structural state, the displacement plug 25 has a clear oversize relative to the bore inside the clamping sleeve 15', whereas, on account of appropriate pretreatment, the displacement plug 25 in the martensitic structural state is displaceable in the opening inside the clamping sleeve 15'. It is merely intended to be indicated here that the same mounting principle, even if constructionally reversed compared with the embodiment according to FIG. 1, can be applied in the case of cutting tools 2' having a central bore 26.

It is also conceivable in principle to configure the clamping sleeve entirely without longitudinal slots, specifically when the location bore 24 therein fits together with the tool shank 12 with especially little clearance, the clamping sleeve 15 is of especially thin-walled configuration and the shrink collar 18 is built to be comparatively sturdy. Such a configuration would, on one hand, meet the demand for high clamping accuracy in several respects, due firstly to the location bore 24 fitting together with the tool shank with little clearance, and furthermore due to the correspondingly smaller clamping travel and finally, to the higher inherent rigidity of the clamping sleeve without slots. On the other hand, a clamping sleeve without slots is stressed up to the limits of its elasticity and there is the risk of such a clamping sleeve cracking. The radial elasticity of the clamping sleeve 15, 15" (FIG. 5) or 15''' (FIG. 6) is increased quite considerably by making longitudinal slots 23, 23" or longitudinal grooves 30, but continuous longitudinal slots 15, at the same time, impair the flexural rigidity of the clamping sleeve, which can have an adverse effect on the clamping accuracy of the entire device. Ways in which the clamping sleeve 15' or 15''' can be configured to be more flexurally rigid despite its slots are indicated in FIGS. 5 and 6.

Figure 5:
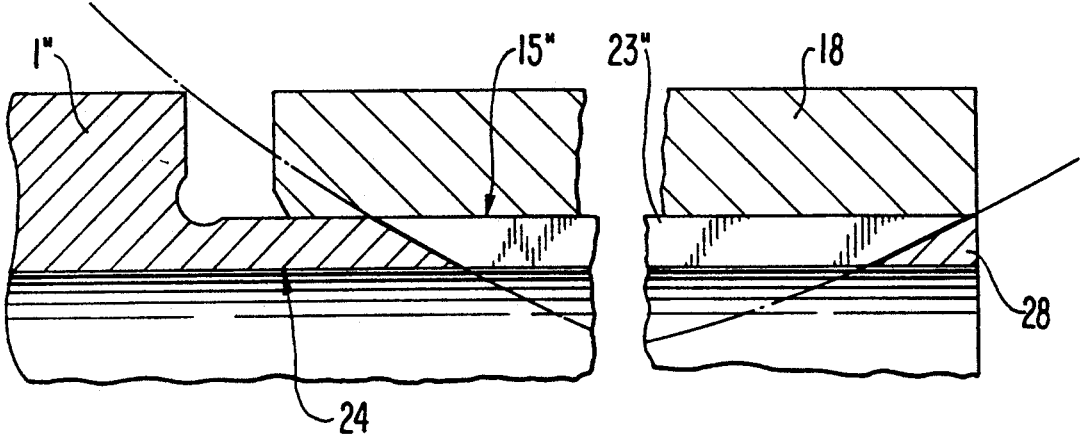
FIG. 5 is a yet further embodiment of a standard shank having a longitudinally slotted but stabilized clamping sleeve.

In the embodiment shown in FIG. 5, for instance, the longitudinal slots 23" made on the clamping sleeve 15" of the standard shank 1" are not milled through up to the free end of the clamping sleeve 15, but a gusset-shaped or triangular residual web 28 is left behind at the free end of the clamping sleeve 15" when milling with a side milling cutter. The residual web 28, with regard to the flexural rigidity of the clamping sleeve 15", has a very stabilizing effect on the two cylindrical shells of the clamping sleeve 15" which adjoin the longitudinal slot 23" in the peripheral direction. The clamping sleeve 15" of FIG. 5 is thus substantially more flexurally rigid than the continuously longitudinally slotted clamping sleeve 15 of FIG. 1. In addition, the residual web 28 prevents dirt or foreign bodies from penetrating into the longitudinal slot 23" and into the area of the contact-surface pair between tool shank and location bore on the one hand and between clamping sleeve and shrink collar on the other hand.

The clamping sleeve 15" according to FIG. 5 is certainly configured in its free end area as, so to speak, a ring closed in the peripheral direction and is open to the risk of cracks in this area when the shrink collar 18 is shrunk on. This would not really be disastrous, however, since the cracks would remain localized to a narrow area and, in the end, would therefore remain harmless. In addition, the stabilizing effect of the residual webs would be retained despite any cracks, at least when the shrink collar 18 is shrunk on firmly.

Figure 6:
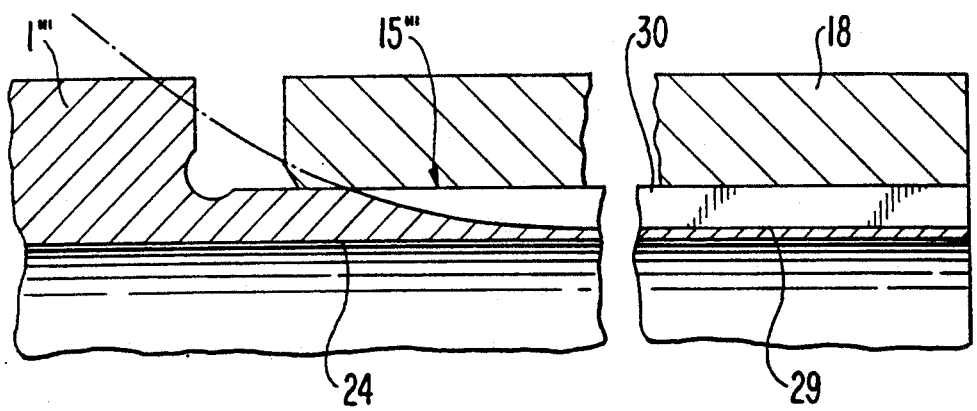
FIG. 6 is a still further embodiment of the invention having a longitudinally grooved clamping sleeve.

In the embodiment of a standard shank 1''' shown in FIG. 6, the clamping sleeve 15''' is provided with longitudinal grooves 30 which in the area of the groove root leave a groove-root web 29 in the wall of the clamping sleeve 15'''. The groove-root web 29 likewise has a stabilizing effect on the wall parts of the clamping sleeve 15''' which adjoin a longitudinal groove in the peripheral direction. Such a clamping sleeve 15''' would be very stable and consequently would also have a very accurate clamping action. If the longitudinal grooves 30 are made in sufficient number and in sufficient width, a sufficiently large radial elasticity of the clamping sleeve 15''' can nonetheless be obtained without too great a risk of crack formation therein. If the groove-root web 29 is kept very thin in the radial direction and very wide in the peripheral direction so that the clamping-sleeve profile is brought close to a splined-shaft profile, the groove-root webs 29 will all be able to arch outwards channel-like with their central, longitudinally running areas when the shrink collar 18 is shrunk on, and in fact without the risk of the limit elasticity of its material being exceeded. Nonetheless, the groove-root webs 29, even in such a configuration, can effectively stabilize the clamping sleeve 15''' at least in the unclamped state or in the not yet completely clamped state and thereby bring about firm clamping in an accurately orientated tool position.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A standard shank for a rotating machining cutting tool for location in a cylindrical location opening, precisely produced with regard to shape and true-running accuracy, in one of a machine tool work spindle, and a location opening of a steep-taper adaptor which can be inserted into the work spindle comprising:

a rotationally symmetric joining cylinder, precisely machined at a periphery thereof, ground on an end of a standard-shank which is adapted to be inserted into the location opening of one of the work spindle and the adaptor, in which the joining cylinder is only slightly undersized relative to the cylindrical location opening in the work spindle, cylindrical connection for securely fixing the cutting tool in the standard shank to provide for the highest possible true-running accuracy of the working surfaces of the cutting tool relative to the joining cylinder of the standard shank, the cylindrical press connection between the standard shank and the cutting tool being formed, on a side adjacent to the standard-shank by a cylindrical location bore machined to a defined diameter and, on a side adjacent the tool by a cylindrical tool shank, adapted in diameter to the location bore, the standard shank having a thin-walled clamping sleeve in the front axial area of the location bore which clamping sleeve is connected monolithically to a remaining portion of the standard shank and is provided at a periphery thereof with a cylindrical outer surface of defined outside diameter, a shrink collar of a shape-memory alloy configured to be pushed onto the clamping sleeve, an axial length of said shrink collar approximately corresponding to, at most, an axial length of the clamping sleeve, wherein the shape-memory alloy is selected with regard to its composition such that an its austenite finishing temperature thereof is below a working temperature, and the shrink collar is passed through manufacture-induced states including working an inner surface of the shrink collar facing the clamping sleeve, starting from an austenitic structural state, to a clear undersize relative to an outside diameter of the clamping sleeve so that high pre-tension theoretically results when the shrink collar is paired with the outer surface of the clamping sleeve, expanding the shrink collar, subsequently transformed by undercooling into a martensitic structural state, in the peripheral direction such that the diameter of the inner surface of the shrink collar in the martensitic structural state has a slight oversize relative to the clamping sleeve, and selectively displacing the shrink collar on the clamping sleeve.

2. The standard shank according to claim 1, wherein the clamping sleeve is provided with one of longitudinal slots and longitudinal grooves.

3. The standard shank according to claim 2, wherein the longitudinal slots are provided with slot-bridging residual webs arranged locally at a free end of the clamping sleeve.

4. The standard shank according to claim 1, wherein the clamping sleeve merges with a shoulder into the outer surface of the standard shank, and a transition from a face of the standard shank, perpendicular to an axis of the standard shank, to the clamping sleeve is filleted sufficiently to cushion a notch effect.

5. The standard shank according to claim 1, wherein an adjusting screw configured to be screwed only with a tight action in the standard shank is arranged at a base of the location bore of the standard shank to adjust the insertion depth of the cutting tool in the location bore, said adjusting screw having a central through bore over its entire length for passage of cooling and lubricating material.

6. The standard shank according to claim 2, wherein the longitudinal slots in the clamping sleeve are arranged in an insertion direction of the cutting tool and are shorter than the insertion depth of the tool shank in the location bore of the standard shank.

7. The standard shank according to claim 1, wherein the shrink collar is a nickel/titanium alloy.

8. The standard shank according to claim 1, wherein the shrink collar is a shape-memory alloy having an expanded hysteresis in which there is a difference of at least 50 to 80 degrees Kelvin between a martensite starting temperature and an austenite starting temperature.

9. The standard shank according to claim 1, wherein the wall thickness of the shrink collar corresponds to at least the wall thickness of the clamping sleeve.

10. A process for precisely producing a standard shank for a rotating machining cutting tool for location in a cylindrical location opening, with regard to shape and true-running accuracy, in one of a machine tool work spindle and a location opening of a steep-taper adaptor which can be inserted into the work spindle comprising:

the steps of grinding a rotationally symmetric joining cylinder, precisely machined at a periphery thereof, on an end of a standard-shank which can be inserted into the location opening of one of the work spindle and the adaptor, in which the joining cylinder is only slightly undersized relative to the cylindrical location opening in the work spindle, securely fixing with a cylindrical press connection the cutting tool in the standard shank to provide for the highest possible true-running accuracy of the working surfaces of the cutting tool relative to the joining cylinder of the standard shank, forming the cylindrical press connection between the standard shank and the cutting tool, on a side adjacent the standard shank by a cylindrical location bore machined to a defined diameter and, on a side adjacent the tool, by a cylindrical tool shank adapted in diameter to the location bore, unitarily connecting the standard shank having a thin-walled clamping sleeve in the front axial area of the location bore to remaining portion of the standard shank and providing a cylindrical outer surface of defined outside diameter at a periphery thereof, pushing a shrink collar of a shape-memory alloy configured to be onto the clamping sleeve, an axial length of said shrink collar approximately corresponding to, at most, an axial length of the clamping sleeve, wherein the shape-memory alloy is selected with regard to its composition (alloy type) such that an its austenite finishing temperature thereof is below a working temperature, and passing the shrink collar through manufacture-induced states including working an inner surface of the shrink collar facing the clamping sleeve, starting from an austenitic structural state, to a clear undersize relative to an outside diameter (D) of the clamping sleeve so that high pre-tension theoretically results when the shrink collar is paired with the outer surface of the clamping sleeve, expanding the shrink collar, subsequently transformed by undercooling into a martensitic structural state, in the peripheral direction such that the diameter of the inner surface of the shrink collar in the martensitic structural state has a slight oversize relative to the clamping sleeve, and selectively displacing the shrink collar on the clamping sleeve.

* * * * *